(12) United States Patent
Cao et al.

(10) Patent No.: US 7,727,624 B2
(45) Date of Patent: Jun. 1, 2010

(54) SUPER-COMPRESSIBLE CARBON NANOTUBE FILMS AND MICRO-BUNDLES

(75) Inventors: Anyuan Cao, Honolulu, HI (US); Pulickel Ajayan, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 584 days.

(21) Appl. No.: 11/602,495

(22) Filed: Nov. 21, 2006

(65) Prior Publication Data

US 2007/0213419 A1    Sep. 13, 2007

Related U.S. Application Data

(60) Provisional application No. 60/739,030, filed on Nov. 22, 2005.

(51) Int. Cl.
*B32B 3/26* (2006.01)
*B32B 3/28* (2006.01)
*C08J 9/00* (2006.01)

(52) U.S. Cl. .............. 428/315.5; 428/315.7; 428/304.4; 428/167; 521/98

(58) Field of Classification Search .............. 428/304.4, 428/315.5, 315.7, 167; 521/98
See application file for complete search history.

(56) References Cited

U.S. PATENT DOCUMENTS 7,473,411 B2 * 1/2009 Ajayan et al. ............ 423/447.1
2003/0165418 A1 * 9/2003 Ajayan et al. ............ 423/447.2
2006/0073089 A1    4/2006 Ajayan et al.

OTHER PUBLICATIONS

Cao et al., "Super-Compressible Foamlike Carbon Nanotube Films," Nov. 25, 2005, Science, vol. 310, pp. 1307-1310.*
Andrews, R. et al., "Continuous production of aligned carbon nanotubes: a step closer to commercial realization," Chem. Phys. Lett., 303, 467-474, 1999.
Baughman et al., "Carbon nanotubes—the route toward applications," Science, 297, 787-792, Aug. 2, 2002.
Falvo et al., "Bending and buckling of carbon nanotubes under large strain," Nature, 389, 582-584, Oct. 7, 1997.
Gibson, L. J., "Mechanical behavior of metallic foams," Annu. Rev. Mater. Sci., 30, 191-227, 2000.
Iijima et al., "Structural flexibility of carbon nanotubes," J. Chem. Phys., 104 (5), 2089-2092, Feb. 1, 1996.
Kinney et al., "Three-dimensional imaging of large compressive deformations in elastomeric foams," J. Appl. Poly. Sci., 80, 1746-1755, 2001.
Lourie et al., "Buckling and collapse of embedded carbon nanotubes," Phys. Rev. Lett., 81, 1638-1641, Aug. 24, 1998.

(Continued)

*Primary Examiner*—Hai Vo
(74) *Attorney, Agent, or Firm*—Foley & Lardner LLP (57) ABSTRACT

An open-cell carbon nanotube foam is made of a plurality of separated carbon nanotubes. The foam exhibits a Poisson's ratio substantially equal to zero, a compressibility of at least 85%, a recovery rate of at least 120 mm/min, a compressive strength of at least 12 MPa, a sag factor of at least 4, a fatigue resistance to no more than 15% permanent deformation when subjected to at least 1,000 compressive cycles at a strain of 85%, and/or a resilience of between 25% and 30%. The carbon nanotubes may be multiwalled carbon nanotubes that are aligned parallel to a thickness of a film comprising the foam.

12 Claims, 4 Drawing Sheets

OTHER PUBLICATIONS

Lu, J. P., "Elastic properties of carbon nanotubes and nanoropes," Phys. Rev. Lett., 79, 1297-1300, Aug. 18, 1997.

Qian et al., "Mechanics of carbon nanotubes," Appl. Mech. Rev. 55 (6), 495-533, Nov. 2002.

Ren et al., "Syntheses of Large Arrays of Well-Aligned Carbon Nanotubes on Glass," Science, 282, 1105-1107, Nov. 6, 1998.

Roberts et al., "Elastic properties of model random three-dimensional open-cell solids," J. Mech. Phys. Solids, 50, 33-55, 2002.

Sazonova et al., "A tunable carbon nanotube electromechanical oscillator," Nature, 431, 284-287, Sep. 16, 2004.

Suhr et al., "Viscoelasticity in carbon nanotube composites," Nature Mater., 4, 134-137, Feb. 2005.

Treacy et al., "Exceptionally high Young's modulus observed for individual carbon nanotubes," Nature, 381, 678-680, Jun. 20, 1996.

Yakobson et al., "Nanomechanics of carbon tubes: instabilities beyond linear response," Phys. Rev. Lett., 76 (14), 2511-2514, Apr. 1, 1996.

Yu et al., "Strength and breaking mechanism of multiwalled carbon nanotubes under tensile load," Science, 287, 637-640, Jan. 28, 2000.

Zhu et al., "Analysis of the elastic properties of open-cell foams with tetrakaidecahedral cells," J. Mech. Phys. Solids., 45 (3), 319-343, 1997.

Zhu et al., "Analysis of the high strain compression of open-cell foams," J. Mech. Phys. Solids, 45 (11/12), 1875-1904, 1997.

* cited by examiner

SUPER-COMPRESSIBLE CARBON NANOTUBE FILMS AND MICRO-BUNDLES

CROSS-REFERENCE TO RELATED PATENT APPLICATIONS

This application claims priority to U.S. Provisional Application 60/739,030, filed on Nov. 22, 2005, which is incorporated herein by reference in its entirety.

BACKGROUND OF THE INVENTION

The present invention relates generally to open-cell foams and more particularly to carbon nanotube foams.

Structural foams have a variety of applications in modern society, such as in construction, energy dissipation, cushioning, and packaging. See L. J. Gibson and M. F. Ashby, *Cellular Solids, Structure and Properties* (Pergamon, New York, 1997); N. C. Hilyard & A. Cunningham, *Low Density Cellular Plastics, Physical Basis of Behavior* (Chapman and Hall, London, UK, 1994). The struts between adjacent cells form the architecture of a foam, and it is the bending and buckling of these struts that allow the foam to be compressed. The properties of the struts (e.g., composition, geometry, dimension) dictate the compressive behavior of foams. See J. H. Kinney et al., "Three-dimensional imaging of large compressive deformations in elastomeric foams," *J. Appl. Poly. Sci.* 80, 1746-1755 (2001); H. X. Zhu et al., "Analysis of the high strain compression of open-cell foams," *J. Mech. Phys. Solids* 45, 1875-1904 (1997).

Compressive strength and compressibility are two important factors that determine the performance and applications of foams. These two factors, however, are of opposing nature. By increasing a foam's volume fraction of cells (i.e., void area between struts), the foam's compressibility is increased while the strength is decreased. See Hilyard & Cunningham (1994); D. Klempner & K. C. Frisch, *Handbook of Polymeric Foams and Foam Technology* (Hanser, New York, 1991), ch. 4, 6, 9; H. X. Zhu et al., "Analysis of the elastic properties of open-cell foams with tetrakaidecahedral cells," *J. Mech. Phys. Solids*. 45, 319-343 (1997). For a foam at a fixed chemical composition, its modulus ($E_f$) decreases with increasing relative cell volume ($\phi$) as $E_f = CE(1-\phi)^2$, where C is a constant (close to unity), and E is the cell edge modulus. See Hilyard & Cunningham (1994). Although metallic foams, such as Al foams, have a relatively higher compressive strength than polymeric foams, metallic foams have poor resilience upon load release due to permanent deformation of the metallic cell structure. See L. J. Gibson, "Mechanical behavior of metallic foams," *Annu. Rev. Mater. Sci.* 30, 191-227 (2000). Thus, there currently exists a need in the art for structural foams with high compressive strength, compressibility, and resilience.

Individual carbon nanotubes possess exceptional mechanical strength, low density, and high elasticity. See M. S. Dresselhaus et al., *Science of Fullerenes and Carbon Nanotubes* (Academic, San Diego, 1996); R. H. Baughman et al., "Carbon nanotubes—the route toward applications," *Science* 297, 787-792 (2002); D. Qian et al., "Mechanics of carbon nanotubes," *Appl. Mech. Rev.* 55, 495-533 (2002). For example, an individual nanotube exhibits extreme structural flexibility and can be repeatedly bent through large angles and strains without structural failure. See supra Qian et al. (2002). See S. Iijima et al., "Structural flexibility of carbon nanotubes," *J. Chem. Phys.* 104, 2089-2092 (1996); V. Sazonova et al., "A tunable carbon nanotube electromechanical oscillator," *Nature* 431, 284-287 (2004); M. R. Falvo et al., "Bending and buckling of carbon nanotubes under large strain," *Nature* 389, 582-584 (1997). The ability of an individual nanotube to adopt and switch between various buckled morphologies makes it capable of accommodating and sustaining large local strains while maintaining structure integrity. See B. I. Yakobson et al., "Nanomechanics of carbon tubes: instabilities beyond linear response," *Phys. Rev. Lett.* 76, 2511-2514 (1996); O. Lourie et al., "Buckling and collapse of embedded carbon nanotubes," *Phys. Rev. Lett.* 81, 1638-1641 (1998). However, to create a carbon nanotube foam for real-world applications, a scalable method is needed to produce a foam containing many nanotubes that collectively contribute to the foam's unique properties up to macroscale levels.

SUMMARY OF THE INVENTION

One embodiment of the invention provides an open-cell carbon nanotube foam comprising a plurality of separated carbon nanotubes. The foam exhibits at least one of a Poisson's ratio substantially equal to zero, a compressibility of at least 85%, a recovery rate of at least 120 mm/min, a compressive strength of at least 12 MPa, a sag factor of at least 4, a fatigue resistance to no more than 15% permanent deformation when subjected to at least 1,000 compressive cycles at a strain of 85%, or a resilience of between 25% and 30%.

Another embodiment of the invention provides an open-cell carbon nanotube foam comprising a plurality of separated, aligned carbon nanotubes, wherein the foam is under compression and the nanotubes collectively buckle to form an aligned zigzag pattern.

DETAILED DESCRIPTION OF THE PREFERRED EMBODIMENTS

The present inventors have developed a carbon nanotube foam wherein individual nanotubes serve as strong nanoscale struts. The space between the nanotube struts serves as the interconnected network of voids of an open-cell foam. The carbon nanotube struts are spatially separated from each other, may be singlewalled or multiwalled, and may be chemically crosslinked. The nanotube foam exhibits super-compressible, foam-like behavior, and can be repeatedly compressed to more than 85% of its thickness. Under compression, aligned nanotubes of the foam collectively form an aligned zigzag pattern that can fully fold and unfold to free length elastically upon load release. Compared to conventional low density flexible foams, the carbon nanotube foam exhibits superior mechanical properties. For instance, the carbon nanotube foam exhibits at least one of a compressive strength of at least 12 MPa, such as 12-15 MPa; a recovery rate of at least 120 mm/min; a sag factor of at least 4; a Poisson's ratio substantially equal to zero; a compressibility of at least 85%; a resilience of at least 25%, such as 25-30%; and a fatigue resistance to no more than 15% permanent deformation when subjected to at least 1,000 compressive cycles at a strain of 85%. The open-cell nature of the nanotube foam provides excellent breathability with a high strength-to-weight ratio, dimensional stability at elevated temperature or humidity, and resistance to chemical environments. Nanotube foams are used in a number of applications, for instance, in flexible electromechanical systems, or as compliant interconnect structures, actuators and coatings for mechanical damping and energy absorbing systems.

Multiwalled carbon nanotubes may be aligned parallel to the thickness of a film made of the nanotube foam. For instance, multiwalled carbon nanotubes can be grown in a direction perpendicular to a growth surface such that the nanotubes are aligned parallel to one another. See Z. F. Ren, et al., "Synthesis of Large Arrays of Well-Aligned Carbon Nanotubes on Glass," *Science* 282, 1105-1107 (1998). In one aspect of the invention, vertically aligned multiwalled nanotubes were grown on a substrate surface by chemical vapor deposition (CVD) with ferrocene and xylene as the precursor. See R. Andrews et al., "Continuous production of aligned carbon nanotubes: a step closer to commercial realization," *Chem. Phys. Lett.* 303, 467-474 (1999). A solution of ferrocene dissolved in xylene (0.01 g/ml) was injected into a CVD furnace at a constant rate of 0.1 ml/min. The solution was carried by argon flow (40 s.c.c.m.) to pass a steel bottle preheated at 180° C. before vaporizing into a quartz tube housed in the furnace. The reaction temperature was set at 750 to 800° C. The average diameter of nanotubes was approximately 40 nm, and the length ranges from 100 μm to 2 mm for growth time of 10 minutes to 2 hours. The as-grown aligned nanotube foam can be removed from the silicon oxide substrate as a freestanding structure by using a blade or by dipping into HCl to dissolve the oxide substrate. After removing the nanotube foams from the substrate, the nanotube foams (with typical areas ranging from 0.5 to 2 $cm^2$) were compressed along the film thickness direction along the nanotubes' axial direction. The foam porosity was calculated as follows. The average diameter (2r) of the aligned nanotubes was 40 nm and the inter-tube distance (D) was ~100 nm, based on the SEM observation. Assuming all the nanotubes have the same length (L), the film porosity (P) is equal to the volume area between the nanotubes divided by the whole film volume, and can be expressed as $P=1-\pi r2L/D2L=87.4\%$.

Figure 1A:
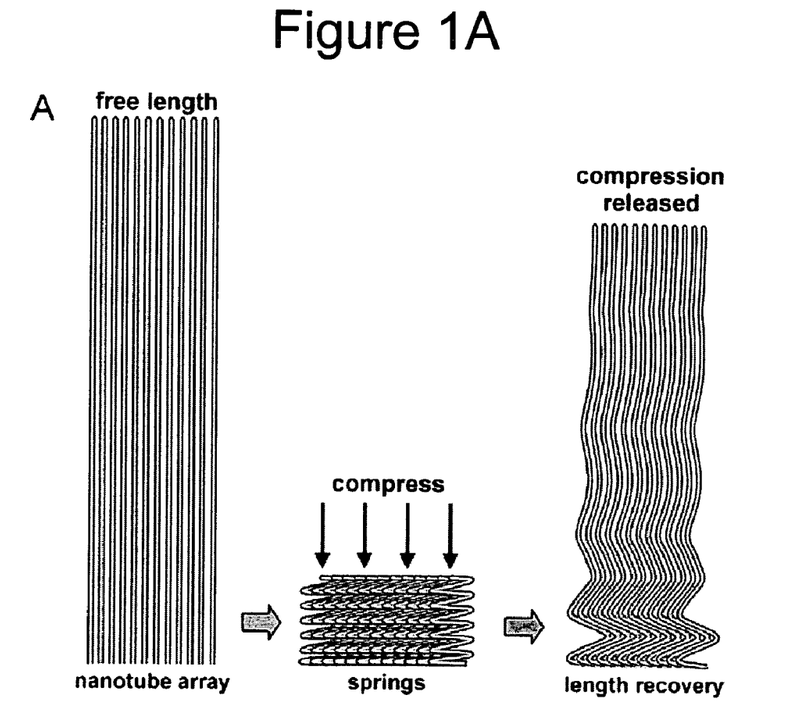
FIGS. 1A and 4A are schematic views of nanotube structures according to preferred embodiments of the present invention.
Figure 1B:
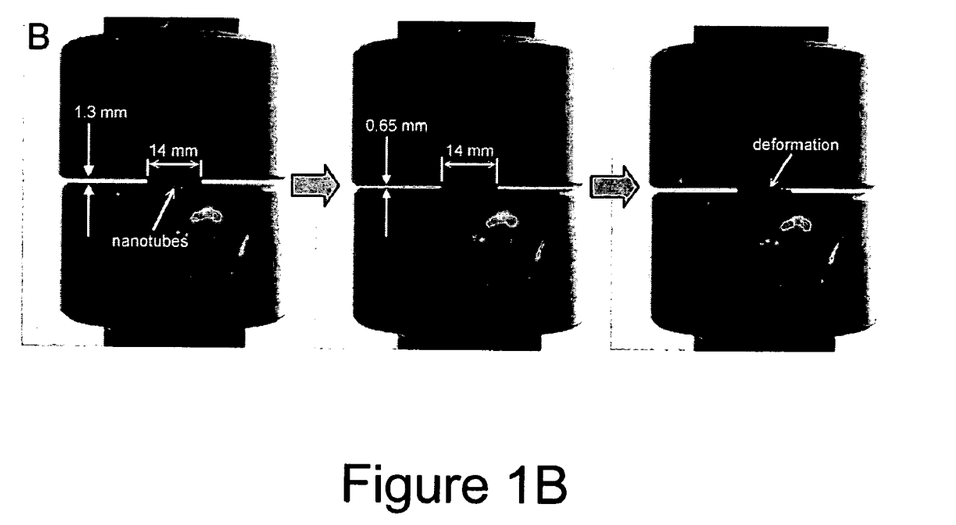
FIG. 1B is a photograph of nanotube foam structures according to a preferred embodiment of the present invention.

FIGS. 1A-B depict compression testing of aligned carbon nanotube foams. The compression testing was done in an Electrical-Mechanical Tester (United, SSTM-1-PC) equipped with a load cell of 4400 N. The freestanding nanotube foams, cut into rectangular pieces (area of 0.5 to 2 $cm^2$), were placed between the two compression heads with a pre-load of 0.1-0.3 MPa. The compression direction is along the nanotube axis and parallel to the thickness of the film. During the compression, the top head was shuttling between a set fixed distance (strain) at a speed of 0.2-120 mm/min ($10^{-3}$ to 1 Hz for a 1 mm thick film). The cyclic compression was recorded by a Sony digital camera.

The three schematics in FIG. 1A illustrate, from left to right: (1) an aligned nanotube foam having an initial cross-sectional film thickness equal to the free length of the carbon nanotubes; (2) the foam under a compressive load applied along the nanotube axes, wherein the nanotubes collectively buckle to form an aligned zigzag pattern; and (3) the foam upon release of the compressive load after 1000 loading cycles whereby the foam recovers approximately 85% of the original film thickness and retains the zigzag pattern at the lower portion of the film. The three photographs in FIG. 1B correspond to the three schematics in FIG. 1A. The photograph on the left in FIG. 1B depicts an original freestanding film (14 mm wide and 1.3 mm thick) placed between two grips before compression. The photograph in the middle in FIG. 1B depicts the film during compression along the aligned nanotube axes in which the film thickness decreased to 0.65 mm (axial strain $\in$=50%); however, the width of film remains substantially constant at 14 mm under compression, indicating no lateral expansion (transverse strain) of the compressed film. Thus, the Poisson's ratio, which is the ratio of transverse strain to axial strain, of the nanotube foam is substantially equal to zero. "Substantially equal to zero" means no change is observed in the transverse dimension of the nanotube foam under visual observation (i.e., observable to the naked eye). The Poisson's ratio is "substantially equal to zero" even if there is a slight expansion in the foam's transverse dimension, such as buckles with amplitudes up to 100 μm, when observed with a microscopic instrument. The photograph on the right in FIG. 1B depicts a permanent film thickness reduction, observed by the appearance of a slight gap between the top grip and the top surface of the nanotube film, after 1000 loading cycles at a set strain of 85%. These photographs show that the nanotube film does not fracture, tear or collapse under compression, but remains at constant width during the cycles.

Repeated compression tests demonstrate that these nanotube struts can be squeezed to less than 15% of their free lengths (i.e., 85% compressibility) by buckling and folding themselves like springs, collectively, in a zigzag pattern. After every cycle of compressive loading, the nanotubes unfold the buckles and recover to their near original lengths, resulting in a strong cushioning effect. Nanotube foams squeezed to 15% of their original thickness are able to fully recover to their original thickness at the end of each cycle for up to several hundred cycles. Thereafter, a gap appears, as in the right-most photograph of FIG. 1B. This gap is stabilized after ten thousands of cycles at a gap of <20% of the total film thickness, for instance less than 15% of the total film thickness when subjected to 1,000 compressive cycles at a compressive strain of 85%.

The process of nanotube film thickness recovery back to original or near-original film thickness occurs very quickly. The compression head was set to retreat at a speed of 120 mm/min, which was the upper limit of the instrument, and the film was observed to follow the returning head closely without any gap between the head and the top surface of the film. Therefore, the film recovery rate is at least equal to the rate of the receding head (>120 mm/min, or 2000 μm/sec). This is much faster than the general recovery rate for conventional flexible foams and spongy structures, especially those made of polymers with time-dependent viscoelasticity that prevents rapid recovery following large strains.

Figure 2A:
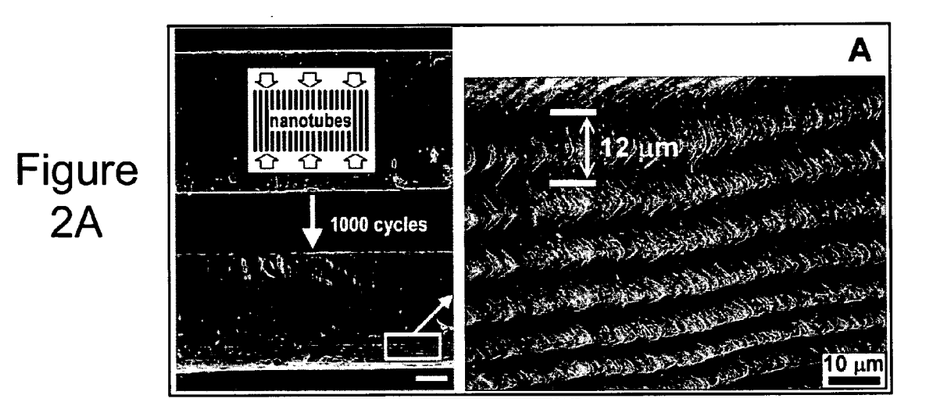
FIGS. 2A-C are SEM images of nanotube foam structures according to preferred embodiments of the present invention.
Figure 2B:
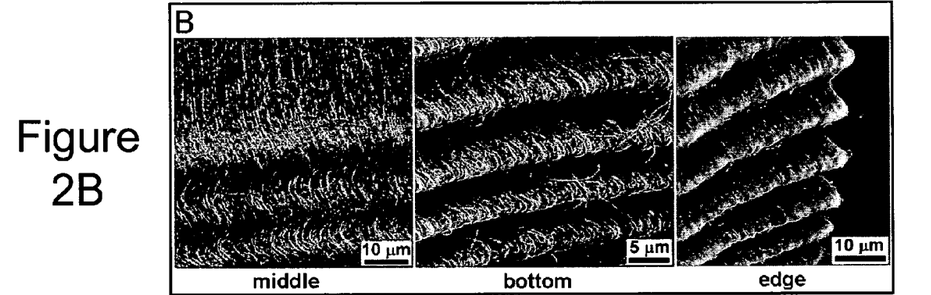
Figure 2C:
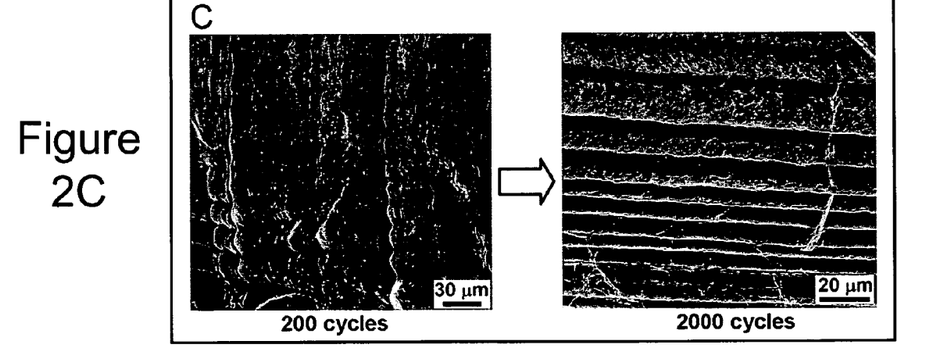

To investigate the morphology of the nanotube foam under compression, the SEM images in FIGS. 2A-C were taken before and after repeated cycling of the foam (>1000 cycles). FIG. 2A provides SEM images of a nanotube foam with an original freestanding film thickness of 860 μm. After 1000 cycles at a strain $\in$=85%, the film was reduced to a freestanding thickness of 720 μm. The bottom portion of the film displays horizontal lines (zigzag buckles) uniformly distributed across the width of the film. Thus, repeated compression after 1000 cycles has converted initially straight nanotubes into buckled folds, with an average wavelength of ~12 µm. FIG. 2B contains SEM images taken on different portions of the same nanotube foam after 1000 cycles. The zigzag buckles near the bottom portion of the film are heavily folded and progressively dissipate towards the middle and top of the film thickness. When the film is flipped during compression, the pattern also flips with heavy folds appearing at the top (still at the bottom side of the as-grown film). This orientation-dependent behavior suggesting that the portion of the nanotube film that was initially nearest the growth surface possesses slightly different mechanical characteristics (e.g., density, stiffness, defect concentration) as compared to the rest of the film. Indeed, when the nanotube film was removed from the growth surface and immersed in an acetone solvent, greater shrinkage was observed near the bottom portion of the as-grown film.

FIG. 2C provides SEM images of a nanotube foam with an original film thickness of 1.2 mm after 200 and 2000 compression loading cycles. The nanotube buckles are very slight after 200 cycles, but became heavily folded after 2000 cycles. The buckling wavelength for this film is larger (25 µm) than for the 860 µm-thick sample. However, the same tendency for greater buckling at the bottom of the film is observed.

In a densely aligned nanotube foam, it is spatially difficult for the separated nanotubes to buckle independently (and randomly) in any appreciable length scale because of the proximity of the neighboring tubes. Under compression, the cooperative nature of the buckling results in a self-organized zigzag folded morphology seen from the edge of compressed film (left image of FIG. 2B), which is the most space efficient and energetically favorable configuration for huge number nanotubes to adopt under large compressive strains. Zigzag buckling occurs when the foam is under compression even prior to the onset of permanent thickness reduction, for instance, during elastic deformation prior to the onset of permanent folds. The folding of these zigzag buckles allows for the maximum volume reduction under the smallest compressive load, and does not require any extra space to accommodate the vertical deformations, resulting in a Poisson's ratio substantially equal to zero.

Figure 3A:
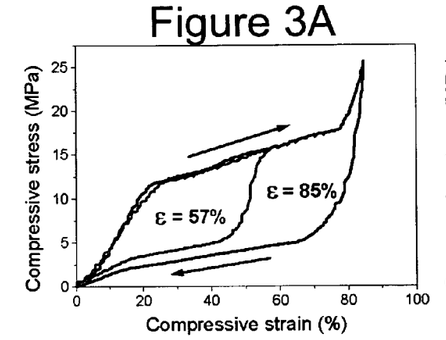
FIGS. 3A-B and 3E are plots of measured compressive stress versus compressive strain according to preferred embodiments of the present invention.

FIGS. 3A-E show plots of observed mechanical properties of the nanotube foams. FIG. 3A shows the compressive stress ($\sigma_{film}$, applied force divided by the film area) versus compressive strain ($\in$, compressed distance relative to film thickness) during the first compression cycle for two nanotube films (thickness ~860 µm) at set maxima $\in$ of 57% and 85%, respectively. Three distinct stages are observed for both films during the loading process up to $\in=85\%$, including: (1) an initial Hookean region at $\in<22\%$ with an elastic modulus just over 50 MPa, (2) a plateau at $22\%<\in<79\%$ with a reduced modulus of approximately 12 MPa, and (3) a final densification marked by rapid rise of stress as $\in$ approaches 85%. Other structural open-cell foams have shown similar three-region characteristics. See Gibson (2000); Kinney (2001); Zhu (1997). The stress loops in both curves indicate that a large portion of energy (64%) is absorbed during compression. This energy dissipation is most likely due to the friction between nanotubes or movement of air through the porous nanotube arrays, which may find use in damping applications.

Because the carbon nanotubes only occupy a 13% volume fraction of the nanotube foam (based on 87% porosity), the actual stress ($\sigma_{cnt}$) on each nanotube is several times higher than the as-measured film stress ($\sigma_{film}$). Thus, $\sigma_{cnt}=\sigma_{film}/13\%=12$ MPa/13%=92 MPa, at $\in=22\%$. Under Euler beam theory, the critical compression stress ($\sigma_{crit}$) beyond which a nanotube strut becomes unstable (starts to buckle) can be expressed as $\sigma_{crit}=E_{CNT}(\pi r/L_{HW})^2$, where $E_{CNT}$ denotes the Young's modulus of nanotubes, r is the nanotube radius (20 nm), and LHW is the half-wavelength of the buckle along nanotubes. See O. Lourie et al., "Buckling and collapse of embedded carbon nanotubes," *Phys. Rev. Lett.* 81, 1638-1641 (1998); S. Timoshenko, *Theory of Elastic Stability* (McGraw-Hill, New York, 1936), ch. 2. An average modulus of multi-walled nanotubes ($E_{CNT}$) of 1 TPa was used based on both experimental measurements and theoretical calculations. See M. M. J. Treacy et al., "Exceptionally high Young's modulus observed for individual carbon nanotubes," *Nature* 381, 678-680 (1996); M. F. Yu et al., "Strength and breaking mechanism of multiwalled carbon nanotubes under tensile load," *Science* 287, 637-640 (2000); J. P. Lu, "Elastic properties of carbon nanotubes and nanoropes," *Phys. Rev. Lett.* 79, 1297-1300 (1997). The critical stress necessary to enable the formation of the 12 µm buckles (half-wavelength of 6 µm) observed in FIG. 2A is, therefore, $\sigma_{crit}=1$ TPa×$(\pi20/6000)^2=110$ MPa, which is only slightly larger than the transition stress observed during the first loading curve ($\sigma_{cnt}=92$ MPa). Thus, the nanotube struts at first are subjected to elastic bending and then form wavelike folds at $\in=22\%$ when the compressive stress is large enough to make them buckle collectively. The slightly lower critical stress for buckling may be due to the structural defects in CVD produced nanotubes, especially near the bottom portion adjacent to the growth surface. According to Hooke's law, the compression rate (force divided by displacement) of the whole film ($R_{film}$) is determined by $R_{film}=\sigma_{film}/\in L$, where L is the original film thickness (860 µm), and was calculated to be 26.5 kPa/µm at $\in<79\%$. Accordingly, the compression rate of individual nanotubes ($R_{cnt}=\sigma_{cnt}/\in L$) with 12 µm buckles is 204 kPa/µm.

Figure 3B:
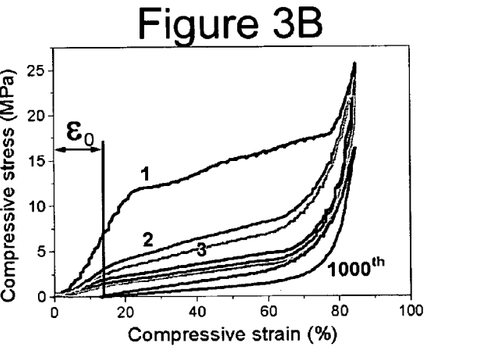
Figure 3C:
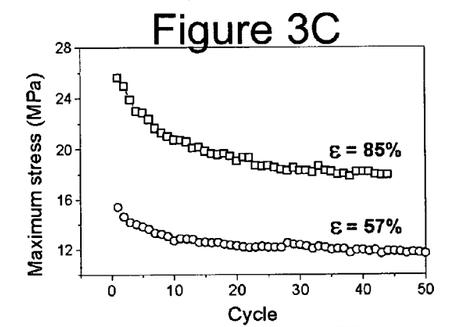
FIG. 3C is a plot of measured maximum stress versus cycle number according to a preferred embodiment of the present invention.
Figure 3D:
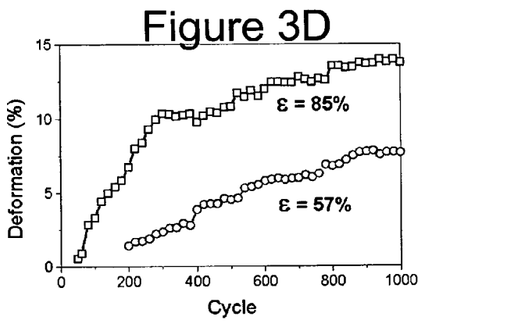
FIG. 3D is a plot of measured deformation versus cycle number according to a preferred embodiment of the present invention.
Figure 3E:
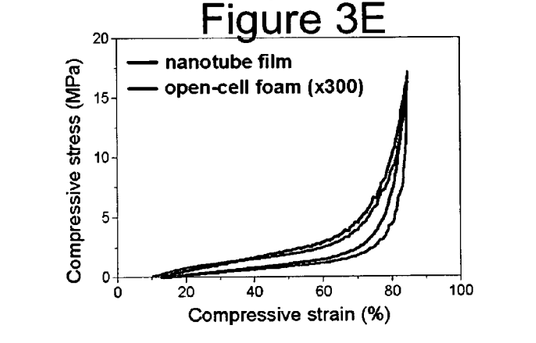

Once the nanotubes have developed the self-organized folded patterns and have buckled collectively, the entire structure becomes softer, as seen by the loss of elasticity and decreased compressive stress in the successive cycles of FIG. 3B. This general behavior is similar to that observed in the first several cycles of other open-cell foams. See N. C. Hilyard, *Mechanics of Cellular Plastics* (Macmillan, New York, 1982), Chap. 3, page 103, and Chap. 6, page 226. As seen in FIG. 3C, the stress at the maximum strain drops rapidly in the first 10 cycles (from 25.6 to 20 MPa, at $\in=85\%$) and then stabilizes at ~18 MPa in subsequent cycles. The maximum degradation in compressive strength of the nanotube film is <30% after 1000 cycles. The permanent thickness reduction (i.e., plastic deformation) of the nanotube foam can be found using the stress value corresponding to the strain coordinate $\in_0=14\%$ for cycle $1000^{th}$, as marked in FIG. 3B. For a repeated compression at a strain of $\in=85\%$, the nanotube film exhibits a fatigue resistance against any further plastic deformation beyond 15%. The film thickness is stabilized at a deformation <15% approaching the $1000^{th}$ cycle, as seen in FIG. 3D. Compression of films at smaller strains (e.g., $\in=57\%$) resulted in a smaller plastic deformation (~7.5%) after thousands of cycles.

The compressive strength (stress corresponding to the plateau region) of nanotube films is between 12-15 MPa, which is much higher than typical low density flexible foams capable of sustaining large strains (e.g., latex rubber, polyurethane) which generally have a plateau stress of only 20 to 30 kPa. See Klempner & Frisch (1991); Hilyard (1982). Measurements on several types of compressible foams and sponges (e.g., cushioning package foam, Gymboree, USA) revealed a maximum compressive strength of 0.02 to 0.1 MPa, at a comparable strain (~85%). This is two to three orders lower than the strength of the nanotube foam observed in FIG. 3E. Additionally, the permanent thickness reduction (i.e., plastic deformation) of such cushion foams is severe (>10%) within the first 10 cycles, and the thickness recovery rate is much slower (in the order of 1 mm/hr) comparing to the fast recovery rate of nanotube foams (>2 mm/min).

In addition, the sag factor is an important criteria for cushioning foams, which is the relative ratio of stresses at two deflections of 65% and 25%, respectively. This criteria represents how much "fight back" will be encountered upon continued compression (sag factor>2.8 is the extra comfort rating for cushions). See Hilyard (1982). For nanotube foams after the $1000^{th}$ cycle ($\in$=65%,σ=3.55 MPa) and ($\in$=25%, σ=0.84 MPa), the sag factor is as high as >4. The resilience of nanotube films is 25% to 30%, measured by dropping a glass ball (1 to 2 mm in diameter) from zero speed onto the film and calculating the ball rebounced height relative to the initial ball-to-film distance before dropping. In addition, the open-cell nature of nanotube foams also provides good breathability (allowing high rate compression and recovery). The high compressive strength, sag factor, resilience, and breathability make nanotube foams suitable for applications requiring strong cushioning effects.

Figure 4A:
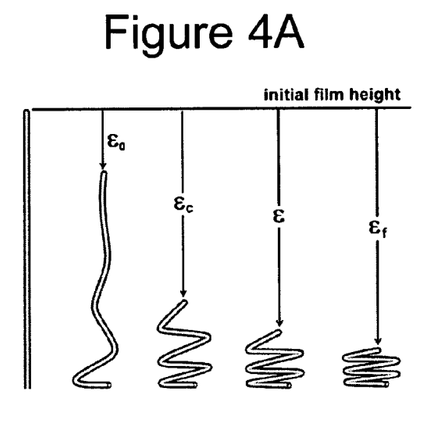
Figure 4B:
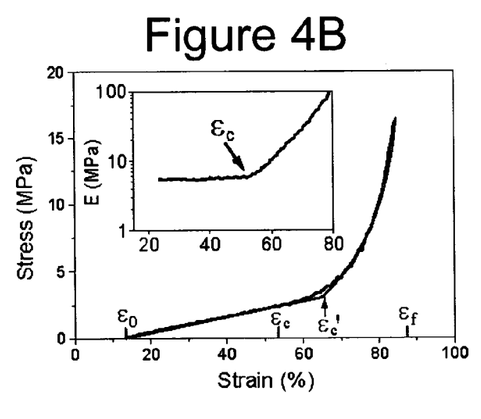
FIG. 4B is a plot of measured stress versus strain according to a preferred embodiment of the present invention.

FIGS. 4A-B model the mechanical behavior of a nanotube foam under large compressive strain. Considering the $1000^{th}$ compression cycle in FIG. 3B, the derivative of its stress-strain curve depicts an initial linear elastic stage up to a critical strain $\in_c$=53% (inset of FIG. 4B) with a single modulus of E=5.85 MPa, after which the modulus increases exponentially with increasing strain. Without requiring the present invention to be bound to any particular theory, the observed exponential increase in stiffness can, but need not, be explained through a complete collapse of individual nanotube folds starting from the bottom portion of the nanotube strut, thus reducing the number of folds participating in further deformations, until all the folds have been fully compressed (corresponding to a final strain of $\in_f$), as illustrated in FIG. 4A.

The initial linear elastic stage can be described following Equation 1, where the compressive stress σ is given by the elastic modulus E multiplied by the strain in the layer, which is found by subtracting off the strain to first contact $\in_0$.

$$\sigma = E(\in - \in_0) \quad \text{[Eqn 1]}$$

The second stage can be expressed differentially by Eqn 2. The non-linear nature of this expression originates from a shortening of the layer as the strain increases; the strain to full compression is $\in_f$. The collapsing of the folded springs begins at the bottom of the film and reduces the length of the film and the number of folded springs that are arranged in series.

$$\frac{d\sigma}{d\varepsilon} = \frac{E}{\varepsilon_f - \varepsilon} \quad \text{[Eqn 2]}$$

The integral solution to Eqn 2 is given by Eqn 3 and 4, where the strain to the first collapse of a fold is given by $\in_c$ which has a corresponding compressive stress of $\sigma_c$.

$$\int_{\sigma_c}^{\sigma} d\sigma' = E \int_{\varepsilon_c}^{\varepsilon} \frac{1}{\varepsilon_f - \varepsilon'} d\varepsilon' \quad \text{[Eqns 3-4]}$$

$$\sigma - \sigma_c = E \ln\left(\frac{\varepsilon_f - \varepsilon_c}{\varepsilon_f - \varepsilon}\right)$$

The stress $\sigma_c$ can be found from Eqn 1 and substituted into Eqn 4 to give a final expression for the compressive stress in the non-linear region.

$$\sigma = E(\varepsilon_c - \varepsilon_o) + \left(\frac{\varepsilon_f - \varepsilon_c}{\varepsilon_f - \varepsilon}\right) \quad \text{[Eqn 5]}$$

Equations (1) and (5) were used to fit the experimental data of the $1000^{th}$ cycle as shown in FIG. 4B. The model featured by these two equations (light curve) fits quite well the experimental data (dark curve) of cycle $1000^{th}$, yielding a critical strain of $\in_c'$=65%. The earlier collapse of nanotube buckles ($\in_c$=53%) in experimental results is attributed to the mechanically weaker region of the film near the bottom surface of the film, where the heaviest buckles were observed in FIG. 2B.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. An open-cell carbon nanotube foam comprising a plurality of separated carbon nanotubes, wherein:
    the carbon nanotubes are aligned parallel to a thickness of the open-cell carbon nanotube foam, the thickness of the open-cell carbon nanotube foam being smaller than an average free length of the carbon nanotubes,
    the carbon nanotubes comprise struts of the foam; and the space between the nanotube struts comprises an interconnected network of voids of the foam,
    the foam is under compression and the nanotubes collectively buckle to form an aligned zigzag pattern, and
    the foam exhibits at least one of:
    a Poisson's ratio substantially equal to zero;
    a compressibility of at least 85%;
    a recovery rate of at least 120 mm/min;
    a compressive strength of at least 12 MPa;
    a sag factor of at least 4;
    fatigue resistance to no more than 15% permanent deformation when subjected to at least 1,000 compressive cycles at a strain of 85%; or
    a resilience of between 25% and 30%.

2. The foam of claim 1, wherein:
    the foam comprises a foam film; and
    the carbon nanotubes comprise multiwalled carbon nanotubes.

3. The foam of claim 2, wherein the foam exhibits a Poisson's ratio substantially equal to zero.

4. The foam of claim 2, wherein the foam exhibits a recovery rate of at least 120 mm/min.

5. The foam of claim 2, wherein the foam exhibits a compressive strength of at least 12 MPa.

6. The foam of claim 2, wherein the foam exhibits a sag factor of at least 4.

7. The foam of claim 2, wherein the foam exhibits a fatigue resistance to no more than 15% permanent deformation when subjected to at least 1,000 compressive cycles at a strain of 85%.

8. The foam of claim 2, wherein the foam exhibits a resilience of between 25% and 30%.

9. The foam of claim 2, wherein the foam exhibits:
a Poisson's ratio substantially equal to zero;
a compressibility of at least 85%;
a recovery rate of at least 120 mm/min;
a compressive strength of at least 12 MPa;
a sag factor of at least 4;
a fatigue resistance to no more than 15% permanent deformation when subjected to at least 1,000 compressive cycles at a strain of 85%; and
a resilience of between 25% and 30%.

10. The foam of claim 2, wherein the foam is formed by a process comprising:
providing a source gas and a catalyst gas onto a heated surface;
growing the plurality of carbon nanotubes in a direction perpendicular to the surface; and
compressing the plurality of carbon nanotubes in the direction perpendicular to the surface.

11. The foam of claim 10, wherein:
the source gas comprises xylenes;
the catalyst gas comprises ferrocene;
the step of growing comprises using a floating catalyst deposition method in a chemical vapor deposition apparatus; and
the process further comprises releasing the formed foam film from the surface.

12. The foam of claim 1, wherein the nanotubes are chemically crosslinked.

* * * * *